United States Patent
Wong

(10) Patent No.: US 10,724,798 B2
(45) Date of Patent: Jul. 28, 2020

(54) COOLING TOWER WITH MULTIPLE-LAYER COOLING UNIT

(71) Applicant: Lee Wa Wong, Monterey Park, CA (US)

(72) Inventor: Lee Wa Wong, Monterey Park, CA (US)

(*) Notice: Subject to any disclaimer, the term of this patent is extended or adjusted under 35 U.S.C. 154(b) by 114 days.

(21) Appl. No.: 15/751,857

(22) PCT Filed: Dec. 8, 2015

(86) PCT No.: PCT/US2015/064455
§ 371 (c)(1),
(2) Date: Feb. 10, 2018

(87) PCT Pub. No.: WO2017/099725
PCT Pub. Date: Jun. 15, 2017

(65) Prior Publication Data
US 2018/0231317 A1 Aug. 16, 2018

(51) Int. Cl.
*F28C 1/04* (2006.01)
*F28F 25/04* (2006.01)
*F28F 25/00* (2006.01)

(52) U.S. Cl.
CPC .......... *F28C 1/04* (2013.01); *F28F 25/04* (2013.01); *F28F 2025/005* (2013.01)

(58) Field of Classification Search
CPC ........ F28C 1/04; F28F 25/04; F28F 2025/005
USPC ............... 261/28, 97, 110, DIG. 11
See application file for complete search history.

(56) References Cited

U.S. PATENT DOCUMENTS

| | | | | |
|---|---|---|---|---|
| 3,598,541 A | * | 8/1971 | Hennemuth et al. | B01J 8/0492 422/607 |
| 3,625,491 A | * | 12/1971 | Yokoi | B01D 45/10 261/23.1 |
| 4,683,101 A | * | 7/1987 | Cates | F28D 5/02 261/146 |
| 6,070,860 A | * | 6/2000 | Kinney, Jr. | F28C 1/04 261/109 |
| 6,527,258 B2 | * | 3/2003 | Bartlok | B01D 3/008 261/110 |
| 6,758,463 B2 | * | 7/2004 | Zone | B01D 3/008 261/110 |
| 8,240,640 B2 | * | 8/2012 | Nakayama | B01D 3/141 261/109 |
| 8,814,148 B2 | * | 8/2014 | Bachmann | B01D 3/008 261/110 |

(Continued)

*Primary Examiner* — Charles S Bushey
(74) *Attorney, Agent, or Firm* — Tsz Lung Yeung

(57) ABSTRACT

A cooling tower includes a tower casing, a pumping device, a water storage tank, at least one cooling assembly and a fan unit. The cooling assembly includes a first multiple-layer cooling unit comprising a first water collection basin, a first fill material unit provided underneath the first water collection basin, and a first water receiving basin provided underneath the first fill material unit and connected to the water storage tank. The second multiple-layer cooling unit includes a second water collection basin connected to the water storage tank, and a second fill material unit provided underneath the second water collection basin. The cooling water in the second water collection basin is arranged to be distributed on the second fill material unit. The water flowing in the second water collection basin is collected in the water storage tank.

16 Claims, 12 Drawing Sheets

(56) References Cited

U.S. PATENT DOCUMENTS

| | | | | |
|---|---|---|---|---|
| 2001/0038155 | A1* | 11/2001 | Bachmann | B01D 3/008 261/97 |
| 2009/0283245 | A1* | 11/2009 | Hentschel | F28C 1/04 165/100 |
| 2013/0276476 | A1* | 10/2013 | Wong | F28F 25/04 62/513 |
| 2018/0224209 | A1* | 8/2018 | Wong | F28C 1/14 |

* cited by examiner

COOLING TOWER WITH MULTIPLE-LAYER COOLING UNIT

BACKGROUND OF THE PRESENT INVENTION

Field of Invention

The present invention relates to a cooling tower which comprising at least two multiple-layer cooling units which facilitate effective and efficient cooling of water in a wide variety of systems.

Description of Related Arts

As shown in FIG. 1 of the drawings, a conventional cooling tower, such as a conventional cooling tower for an air-conditioning system, usually comprises a tower housing 10P having an air inlet 11P provided at two side portions of the tower housing 10P, an air outlet 12P provided at a top portion of the tower housing 10P, a water storage tank 13P provided at a bottom portion of the tower housing 10P, two water inlets 14P spacedly provided at a top portion of the tower housing 10P, a water outlet 15P provided at the bottom portion of the tower housing 10P and is communicated with the water storage tank 13P, two fill material units 16P provided in the tower housing 10P at a position underneath the two water inlets 14P respectively, and a fan unit 17P provided at a top portion of the tower housing 10P at a position between the two water inlets 14P.

Referring to FIG. 2 of the drawings, it illustrates a circulation cycle of the cooling water. The conventional cooling tower further comprises a pumping device 18P provided in the tower housing 10P for pumping the cooling water. The water storage tank 13P is connected to a condenser 100P through the pumping device 18P so that water collected in the water storage tank 13P is pumped to the condenser 100P for absorbing heat. The condenser 100P may be a heat exchanging device of an air conditioning system. The water leaving the condenser 100P is arranged to be pumped to the water inlet 14P. Typically, the conventional cooling water further comprises two spraying nozzles 19P rotatably mounted on the water inlets 14P respectively, wherein the water passing through the water inlets 14P is evenly sprayed on the corresponding fill material units 16P.

The water falling on the fill material unit 16P naturally moves in a top-down manner along the fill material unit 16P and forms a thin water film therein. At the same time, ambient air is arranged to transversely pass through the tower housing 10P from the air inlet 11P to the air outlet 12P. Since the temperature of the ambient air is lower than that of the water passing through the fill material unit 16P, the ambient air and the water film are arranged to perform heat exchange so that the ambient air will extract heat from the thin water film. The water passing through the fill material unit 16P is eventually collected in the water storage tank 13P and is ready for another circulation cycle. The ambient air having absorbed the heat from the thin water film is then discharged to the ambient atmosphere through the air outlet 12P.

There exist a number of disadvantages in associated with the above mentioned conventional cooling tower. First, in order to achieve a relatively effective cooling performance of the thin water film, a thickness of the fill material unit 16P must be very large. For example, for a 300RT air conditioning system, a minimum of 900 mm thickness of the fill material unit 16P is typically required. The greater the thickness of a fill material unit 16P for a given cooling performance, the larger the consumption of material.

Furthermore, because of the relatively bulky size of the fill material unit 16P, in order to evenly spray the cooling water on the fill material unit 16P, the spraying nozzles must be rotating. In addition, the spraying pressure of the cooling water must be sufficiently high. This implies that more power must be used by the pumping device 18P.

Third, the fill material unit 16P has uneven heat transfer performance along a transverse direction thereof. As shown in FIG. 2 of the drawings, ambient air is drawn into the tower housing 10P from the air inlet 11P and discharged through the air outlet 12P. When ambient passes through the fill material unit 16P, it continuously perform heat exchange with the thin water film. As a result, the temperature difference between the ambient air and the thin water film as the air passes through the fill material unit 16P decreases along the transverse direction thereof. The result is that heat exchange efficiency decreases as the air passes from the air inlet 11P to the air outlet 12P.

Fourth, from efficiency standpoint, the power consumption of the pumping device 18P is affected or determined by the rate at which the ambient air passes through the fill material unit 16P, which, due to its inherent thickness, possesses a predetermined amount of resistance to the air. In turn, the thickness of the fill material unit 16P is affected by the manner in which the cooing water is distributed on the fill material unit 16P.

Thus, each of the components in a conventional cooling tower such as the one described above play a role in affecting the overall performance and efficiency of the cooling tower. In order to improve the overall efficiency of the cooling tower, it is imperative that each of these components be improved. The reality is that it is very difficult and costly to simultaneously improve all of these components.

Accordingly, there is a need to develop a cooling tower which is more efficient, effective and is capable of saving electrical energy and raw materials.

SUMMARY OF THE PRESENT INVENTION

Certain variations of the present invention provide a cooling tower which comprises at least two multiple-layer cooling units which facilitate effective and efficient cooling of water.

Certain variations of the present invention provide a cooling tower which comprises at least two multiple-layer cooling units in which cooling water is delivered to the two multiple-layer cooling units in parallel.

Certain variations of the present invention provide a cooling tower which comprises at least two multiple-layer cooling units which may be arranged in an up-down manner or in a side-by-side manner depending on the circumstances in which the present invention operates.

In one aspect of the present invention, the present invention provides a cooling tower for connecting to a heat exchanging device, comprising:

a tower casing having an air inlet and an air outlet;

a pumping device provided in the tower casing;

a water storage tank provided at a bottom portion of the tower casing for storing a predetermined amount of cooling water;

at least one cooling assembly, comprising:

a first multiple-layer cooling unit, which comprises:

a first water collection basin connected to the water storage tank, the cooling water in the water storage tank being arranged to pump to the first water collection basin;

a first fill material unit provided underneath the first water collection basin, the cooling water in the first water collection basin being arranged to be distributed on the first fill material unit; and a first water receiving basin provided underneath the first fill material unit and connected to the water storage tank, the cooling water flowing from the first fill material unit being collected in the first water receiving basin; and a second multiple-layer cooling unit, which comprises:

a second water collection basin connected to the water storage tank, the cooling water in the water storage tank being arranged to pump to the second water collection basin; and a second fill material unit provided underneath the second water collection basin, the cooling water in the second water collection basin being arranged to be distributed on the second fill material unit, the water flowing in the second water collection basin being collected in the water storage tank; and a fan unit provided in the tower casing for drawing air to flow from the air inlet to the air outlet, the cooling water collected in the water storage tank being arranged to be guided to flow back to the first water collection basin and the second water collection basin in a parallel manner, a predetermined amount of air being drawn from the air inlet for performing heat exchange with the cooling water flowing through the first fill material unit and the second fill material unit for lowering a temperature of the cooling water, the air having absorbed the heat from the cooling water being discharged out of the first fill material unit and the second fill material unit through the air outlet.

DETAILED DESCRIPTION OF THE PREFERRED EMBODIMENT

Figure 1:
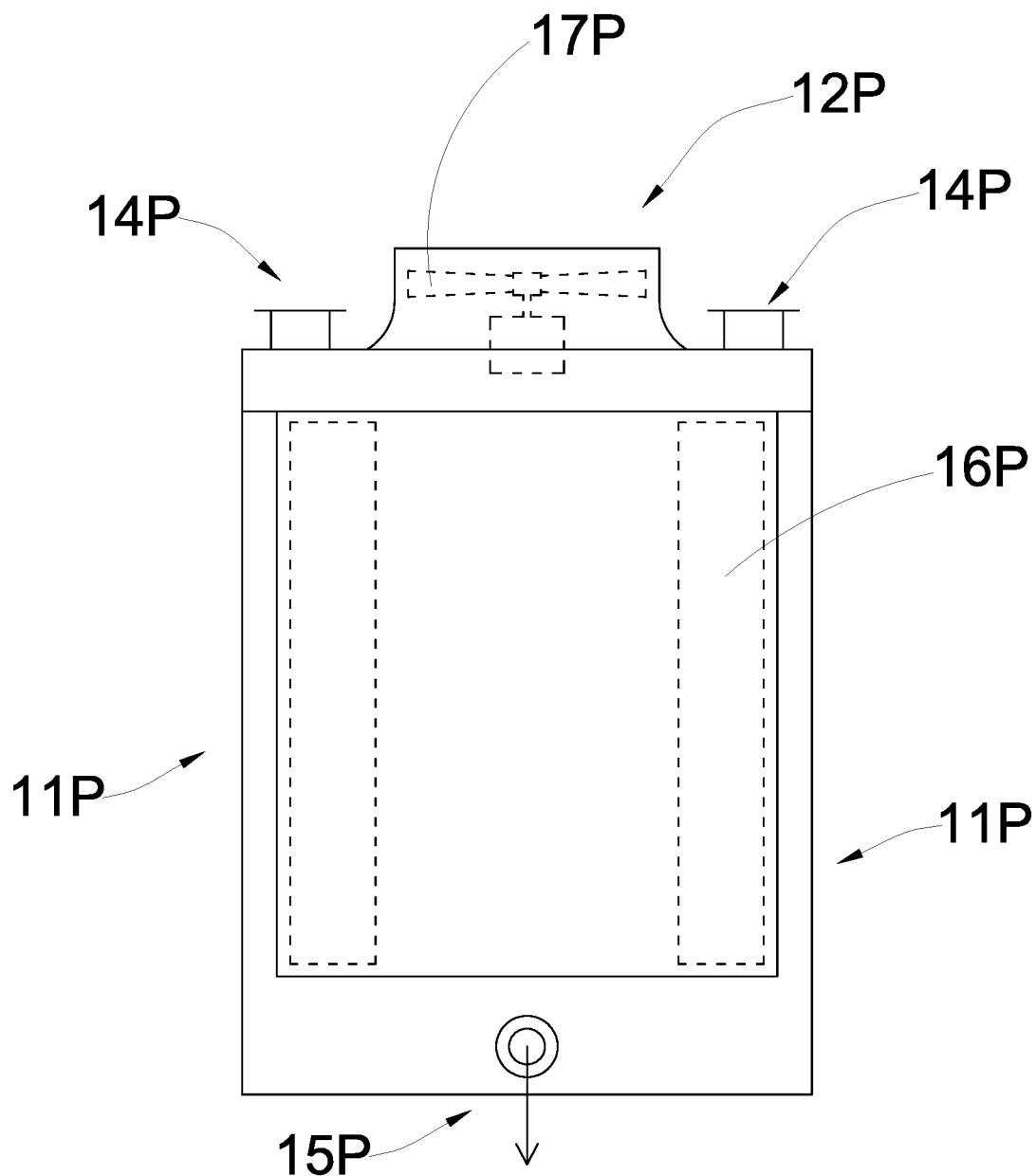
FIG. 1 is a schematic diagram of a conventional cooling tower.
Figure 2:
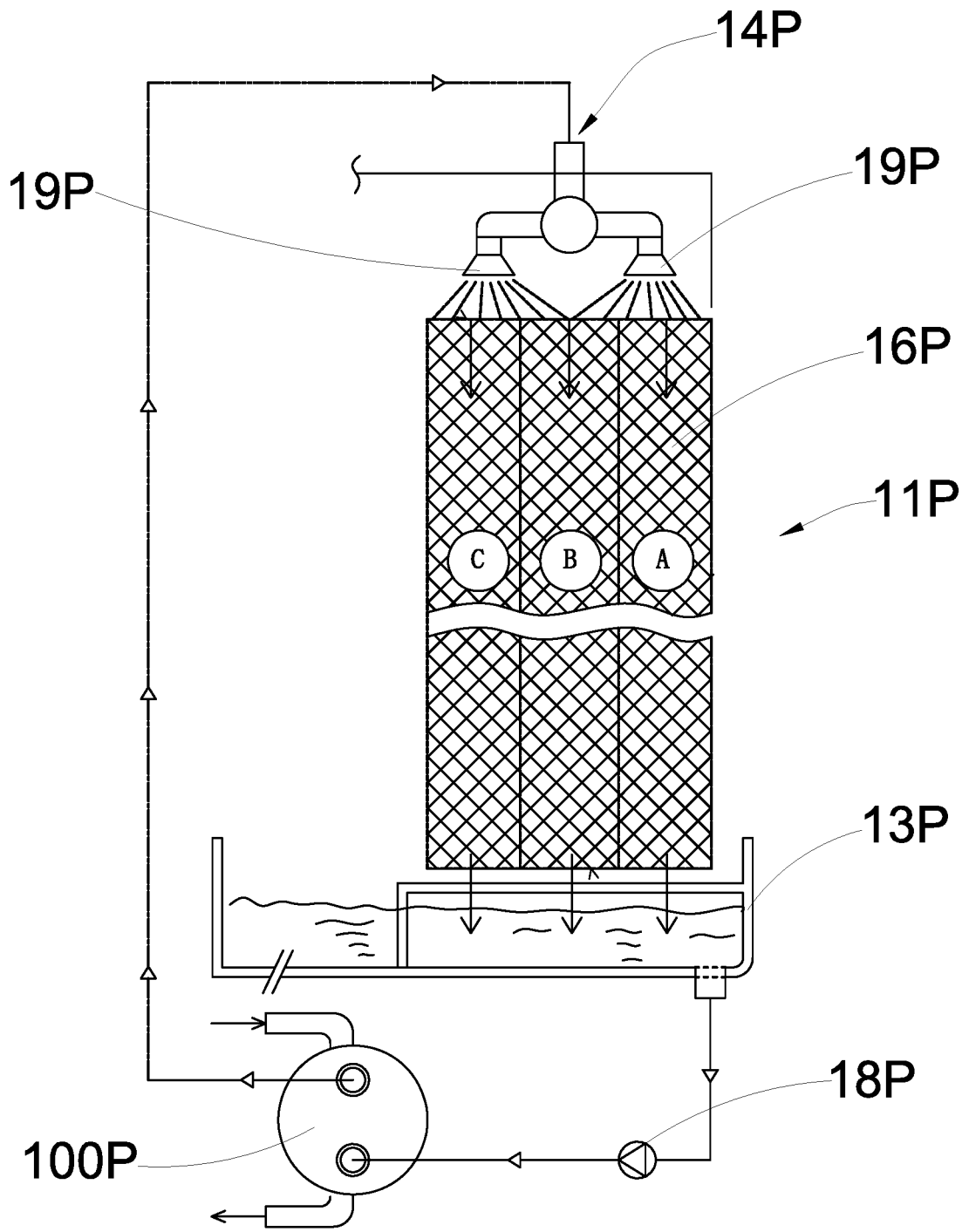
FIG. 2 is another schematic diagram of the conventional cooling tower.

The following detailed description of the preferred embodiment is the preferred mode of carrying out the invention. The description is not to be taken in any limiting sense. It is presented for the purpose of illustrating the general principles of the present invention.

Referring to FIG. 3 to FIG. 14 of the drawings, a cooling tower according to a preferred embodiment of the present invention is illustrated. The cooling tower 1 is for connecting to a heat exchanging device 900, such as a condenser of an air conditioning system. Broadly, the cooling tower may comprise a tower casing 10 having at least one air inlet 11 and at least one air outlet 12, a pumping device 20 provided in the tower casing 10, a water storage tank 30, at least one cooling assembly 100 comprising a first multiple-layer cooling unit 40 and a second multiple-layer cooling unit 50, and a fan unit 70.

The water storage tank 30 may be provided at a bottom portion of the tower casing 10 for storing a predetermined amount of cooling water.

The first multiple-layer cooling unit 40 may comprise a first water collection basin 41, a first fill material unit 42, and a first water receiving basin 43. The first water collection basin 41 may be connected to the water storage tank 30. The cooling water in the water storage tank 30 may be pumped to the first water collection basin 41.

The first fill material unit 42 may be provided underneath the first water collection basin 41. The cooling water in the first water collection basin 41 may be arranged to be evenly distributed on the first fill material unit 42.

The first water receiving basin 43 may be provided underneath the first fill material unit 42 and may be connected to the water storage tank 30, wherein the cooling water flowing from the first fill material unit 42 may be collected in the first water receiving basin 43.

The second multiple-layer cooling unit 50 may comprise a second water collection basin 51, and a second fill material unit 52. The second water collection basin 51 may be connected to the water storage tank 30, wherein the cooling water in the water storage tank 30 may be pumped to the second water collection basin 51.

The second fill material unit 52 may be provided underneath the second water collection basin 51, wherein the cooling water in the second water collection basin 51 may be arranged to be evenly distributed on the second fill material unit 52. The water flowing in the second water collection basin 51 may be directly collected in the water storage tank 30.

The fan unit 70 may be provided in the tower casing 10 for drawing air to flow from the air inlet 11 to the air outlet 12. The cooling water collected in the water storage tank 30 may be guided to flow to the first water collection basin 31 and the second water collection basin 41 in a parallel manner. At the same time, a predetermined amount of air may be drawn from the air inlet 11 for performing heat exchange with the cooling water flowing through the first fill material unit 42 and the second fill material unit 52 for lowering a temperature of the cooling water. The air having absorbed the heat from the cooling water may be discharged out of the first fill material unit 42 and the second fill material unit 52 and the tower casing 10 through the air outlet 12.

According to the preferred embodiment of the present invention, the cooling tower of the present invention may be installed to lower the temperature of the cooling water or other liquid, which may circulate in a heat exchanging device 900 for extracting heat from the heat exchanging device 900 or the system in which the heat exchanging device 900 operates. As an example, the heat exchanging device 900 may be a condenser of an air conditioning system. The cooling tower may also be installed in a power plant, a chemical plant, a factory, or other industrial or chemical systems.

The tower casing 10 may have a rectangular cross section having a top side 101, a bottom side and four peripheral sides 102. The tower casing 10 may have altogether four air inlets 11 formed on four peripheral sides 102 of the tower casing 10 respectively. Obviously, the tower casing 10 may be embodied as having a wide variety of cross sections for suiting different operational environments and for accommodating any number of cooling assemblies 100.

The pumping device 20 may be connected between the heat exchanging device 900 and the multiple-layer cooling units 40, 50 for circulating cooling water between the cooling tower and the heat exchanging device 900.

Figure 3:
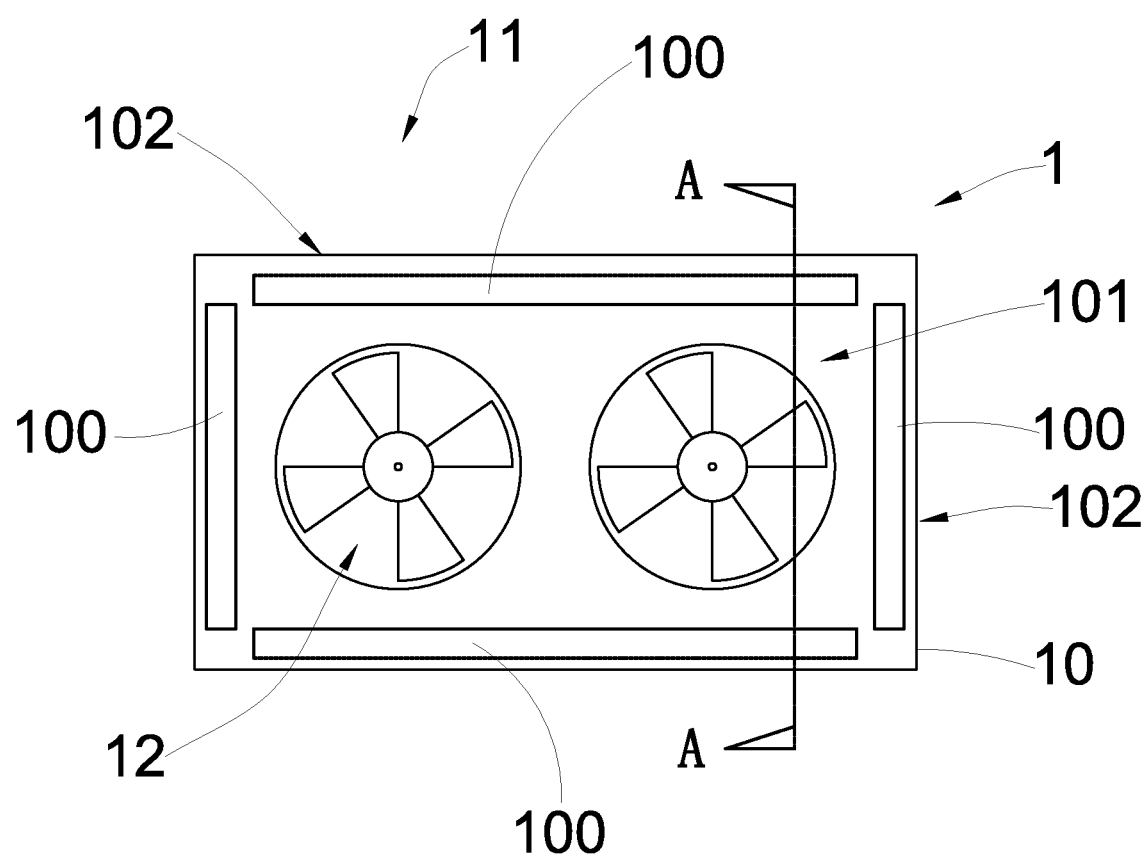
FIG. 3 is a top view of a cooling tower according to a preferred embodiment of the present invention.
Figure 4:
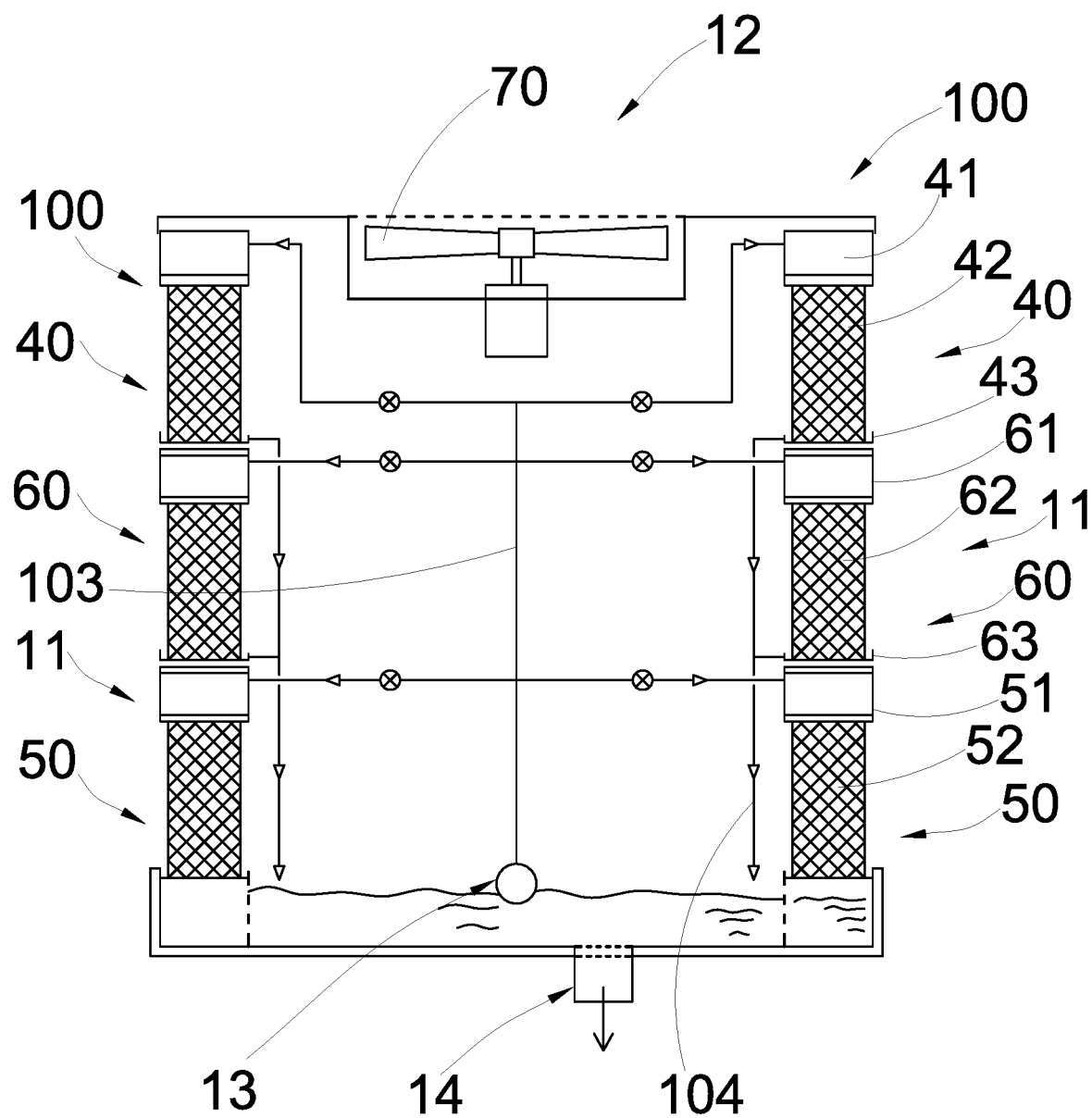
FIG. 4 is a sectional side view of the cooling tower along plane A-A of FIG. 3.
Figure 5:
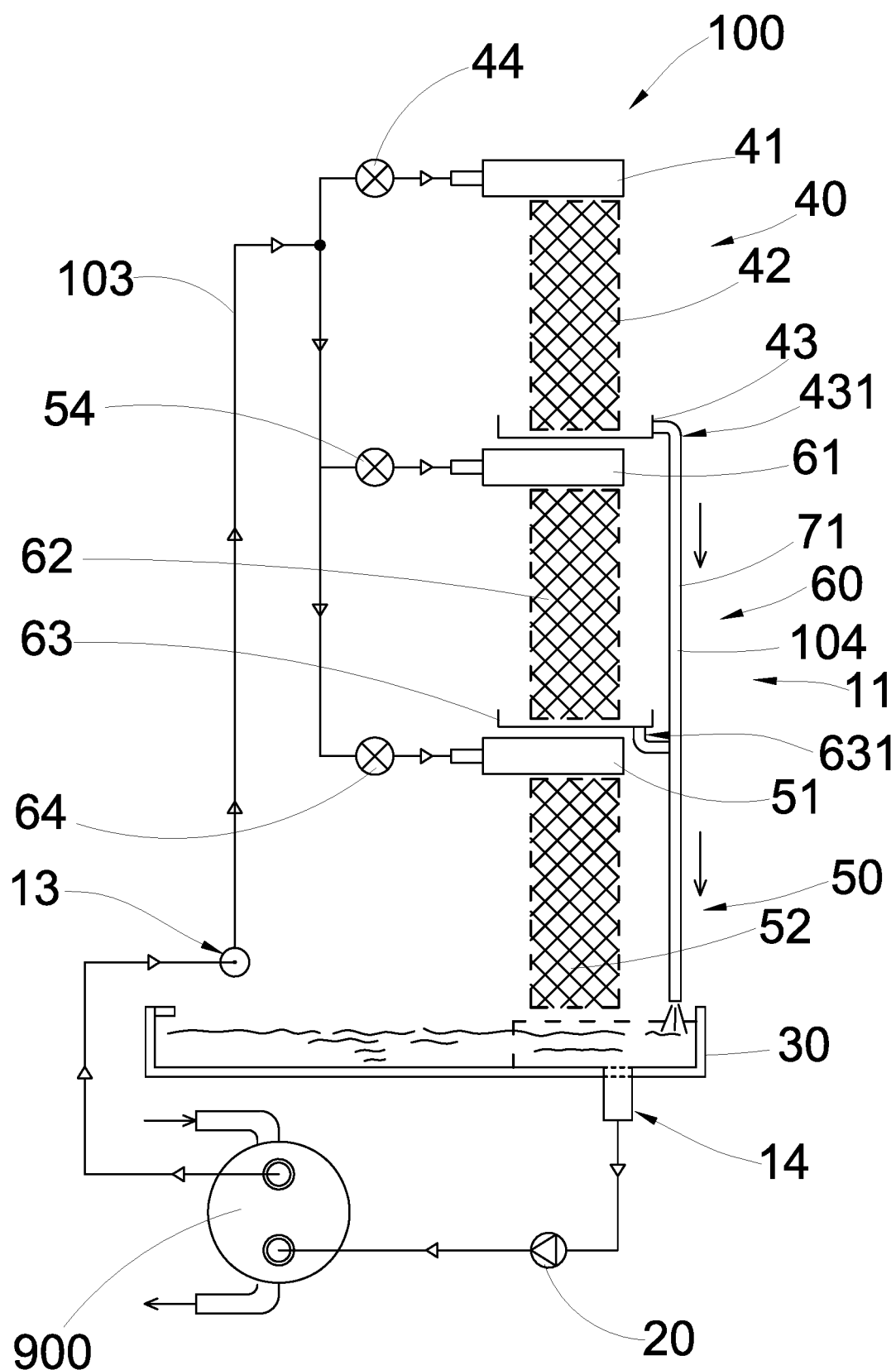
FIG. 5 is a schematic diagram of the cooling tower according to the preferred embodiment of the present invention, illustrating a circulation path of the cooling water.

As shown in FIG. 5 of the drawings, the cooling assembly 100 of the cooling tower may comprise a plurality of multiple-layer cooling units arranged in a vertical direction. The cooling tower may have at least two multiple-layer cooling unit such as the first multiple-layer cooling unit 40 and the second multiple-layer cooling unit 50 as described above. In practice, however, the number of the multiple-layer cooling units may be varied depending on the circumstances in which the cooling tower is to be utilized. Similarly, the cooling tower of the present invention may comprise a plurality of cooling assemblies 100 which may be received in the tower casing 10 for lowering a temperature of the cooling water. FIG. 3 and FIG. 4 illustrate a cooling tower in which a total of four cooling assemblies 100 are utilized. Within each cooling assembly 100, a total of three multiple-layer cooling units are employed. Thus, the cooling assembly 100 may further comprise a third multiple-layer cooling unit 60 provided between the first multiple-layer cooling unit 40 and the second multiple-layer cooling unit 50. The first through third multiple-layer cooling unit 40, 50, 60 are positioned and supported in vertical manner. FIG. 4 and FIG. 5 illustrate two different configurations of how the first through third multiple-layer cooling units 40, 50, 60 may be arranged.

The third multiple-layer cooling unit 60 is structurally identical to the first multiple-layer cooling unit 40. Accordingly, the third multiple-layer cooling unit 60 may comprise a third water collection basin 61, a third fill material unit 62, and a third water receiving basin 63. The third water collection basin 61 may be connected to the water storage tank 30. The cooling water in the water storage tank 30 may be pumped to the third water collection basin 61.

The third fill material unit 62 may be provided underneath the third water collection basin 61. The cooling water in the third water collection basin 61 may be arranged to be evenly distributed on the third fill material unit 62.

The third water receiving basin 63 may be provided underneath the third fill material unit 62 and may be connected to the water storage tank 30, wherein the cooling water flowing from the third fill material unit 62 may be collected in the third water receiving basin 63. The water collected in the third water receiving basin 63 may be guided to flow back to the water storage tank 30.

As shown in FIG. 4 to FIG. 5 of the drawings, the third water receiving basin 63 and the first water receiving basin 43 may be connected to a common collection pipe 104 which extends from the third water receiving basin 63 and the first water receiving basin 43 to the water storage tank 30 for guiding the cooling water receiving in the third water receiving basin 63 and the first water receiving basin 43 to flow to the water storage tank 30 for undergoing another circulation cycle.

As shown in FIG. 2 to FIG. 5 of the drawings, the tower casing 10 may further have a water inlet 13 and a water outlet 14. The water inlet 13 communicates the first through third water collection basin 41, 51, 61 with the heat exchanging device 900. Cooling water from the heat exchanging device 900 is guided to flow through the water inlet 13 and is distributed to each of the first water collection basin 41, the second water collection basin 51 and the third water collection basin 61, through a plurality of connecting pipes 103.

In order to control and manage the flow rate of the cooling water entering the first through third water collection basin 41, 51, 61, the first multiple-layer cooling unit 40 may further comprise a first water control valve 44 provided in the corresponding connecting pipe 103 for controlling the flow rate of the water flowing into the first water collection basin 41. Similarly, the second multiple-layer cooling unit 50 may further comprise a second water control valve 54 provided in the corresponding connecting pipe 103 for controlling the flow rate of the water flowing into the second water collection basin 51. Furthermore, the third multiple-layer cooling unit 60 may further comprise a third water control valve 64 provided in the corresponding connecting pipe 103 for controlling the flow rate of the water flowing into the third water collection basin 61.

Figure 6:
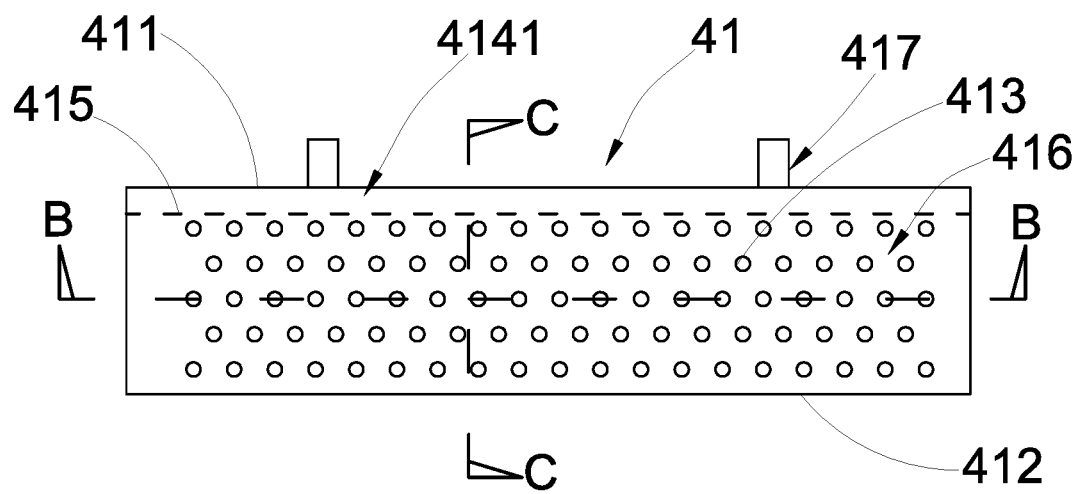
FIG. 6 is a top view of a first water collection basin of the cooling tower according to the preferred embodiment of the present invention, illustrating a circulation path of the cooling water.
Figure 7:
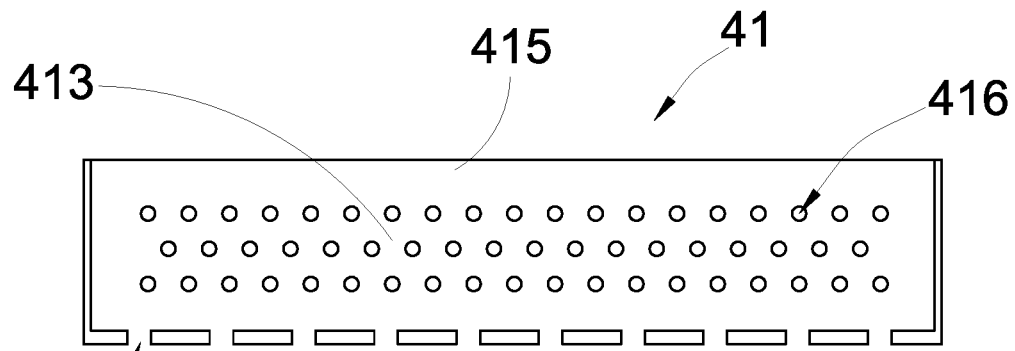
FIG. 7 is a sectional view of the first water collection basin along plane B-B of FIG. 6.
Figure 8:
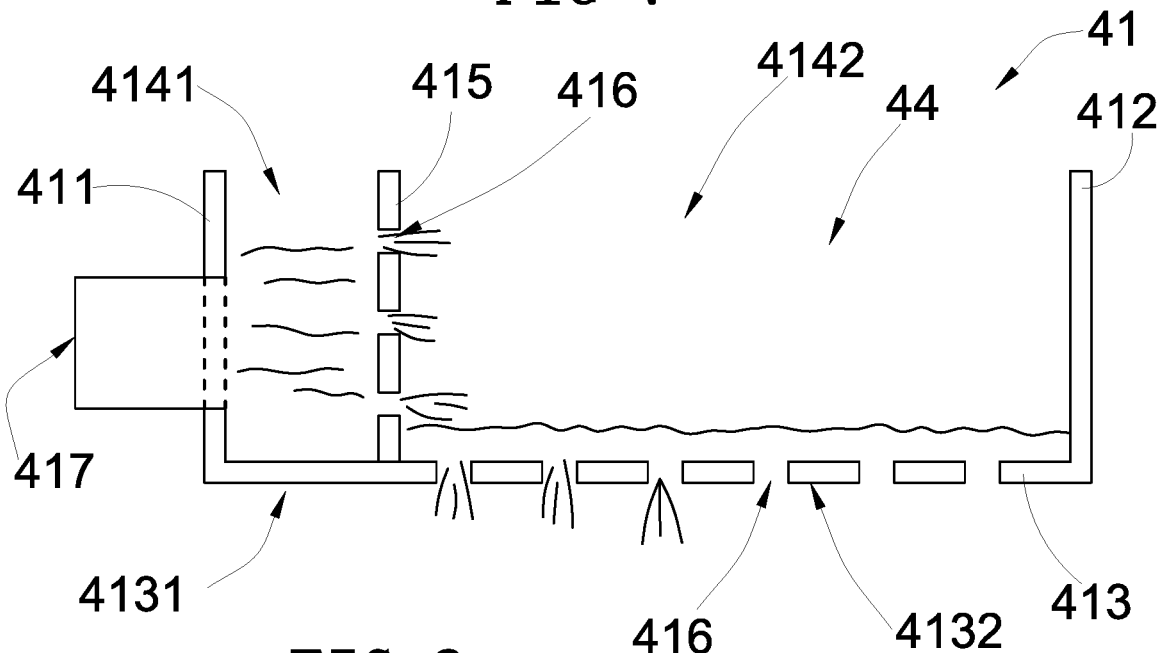
FIG. 8 is a sectional view of the first water collection basin along plane C-C of FIG. 6.

Referring to FIG. 6 to FIG. 8 of the drawings, the first water collection basin 41 may have an elongated cross section and have a first inner sidewall 411, a first outer sidewall 412, and a first bottom wall 413 extended between the first inner sidewall 411 and the first outer sidewall 412. The first water collection basin 41 have a collection cavity 415 formed in a space between the first inner sidewall 411, the first outer sidewall 412 and the first bottom wall 413.

Moreover, the first water collection basin 41 may further have a first partitioning wall 415 upwardly extended from the first bottom wall 413 to divide the collection cavity 414 into a first water guiding compartment 4141 and a first water distribution compartment 4142, and to divide the first bottom wall 413 into a first inner portion 4131 and a first outer portion 4132, wherein the first water guiding compartment 4141 is formed in a space between the first inner sidewall 411, the first partitioning wall 415, and the inner portion 4131 of the first bottom wall 413. The first water distribution compartment 4142 is formed in a space between the first partitioning wall 415, the first outer sidewall 412, and the outer portion 4132 of the first bottom wall 413.

The first water collection basin 41 may further have a plurality of first passage holes 416 spacedly formed on the first partitioning wall 415 and the first outer portion 4132 of the first bottom wall 413 for allowing cooling water to pass therethrough. It is worth mentioning that the first passage holes 416 formed on the first bottom wall 413 may be arranged in a predetermined array, wherein a center of each of the passage holes 416 in a particular row may be arranged not to align with that of the passage hole 416 in the next upper or lower row. Moreover, each two adjacent passage holes 416 of an upper row may be arranged to form a triangular distribution with a corresponding passage hole 416 of the adjacently upper or lower row of the passage holes 416, as shown in FIG. 7 of the drawings. All of the passage holes 416 may have an identical shape and size.

The first water collection basin 41 may further comprise a first collection inlet 417 provided on the first inner sidewall 411, wherein the first collection inlet 417 may be connected to the water inlet 13 of the tower casing 10 and the first water control valve 44 so that the cooling water stored in the water storage tank 30 may be pumped into the first water collection basin 41 through the first collection inlet 417.

As shown in FIG. 8 of the drawings, the cooling water passing through the first collection inlet 417 may be arranged to temporarily store in the first water guiding compartment 4141. The cooling water in the first water guiding compartment 4141 may pass through the first partitioning wall 415 through the corresponding passage holes 416 thereof, and enter the first water distribution compartment 4142.

The cooling water in the first water distribution compartment 4142 may then be allowed to flow through the passage holes 416 formed on the first outer portion 4132 of the bottom wall 413 and eventually reach the first fill material unit 42. It is worth mentioning that by using the first partitioning wall 414 for pre-distributing the cooling water coming from the first water guiding compartment 4141, the flow rate and a height of the cooling water in the first water distribution compartment 4142 may become more or less the same throughout the first water distribution compartment 4142. This phenomenon ensures that cooling water can be evenly distributed along a transverse direction of the first fill material unit 42.

Figure 9:
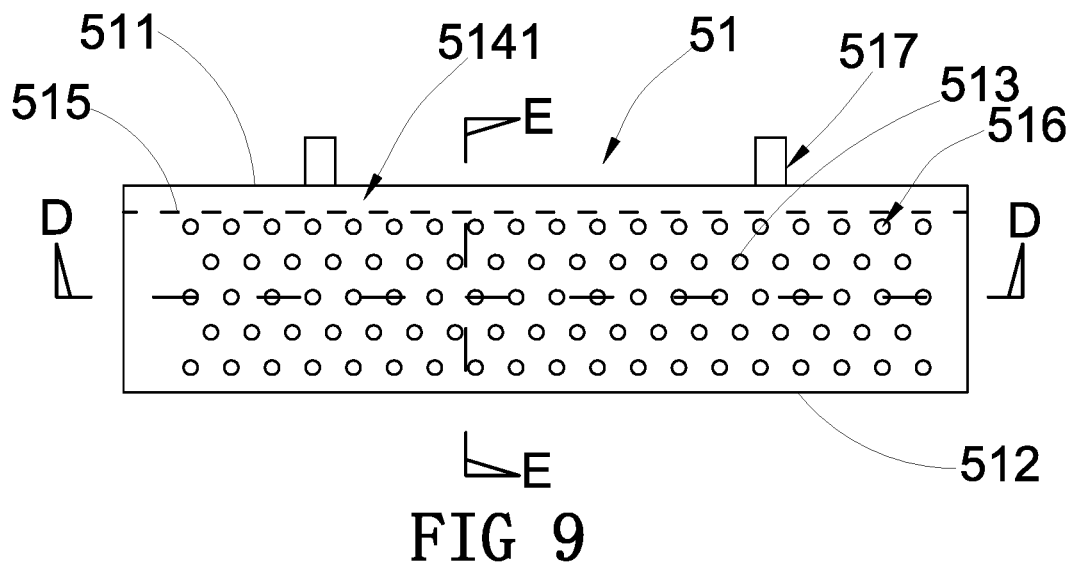
FIG. 9 is a top view of a second water collection basin of the cooling tower according to the preferred embodiment of the present invention, illustrating a circulation path of the cooling water.
Figure 10:
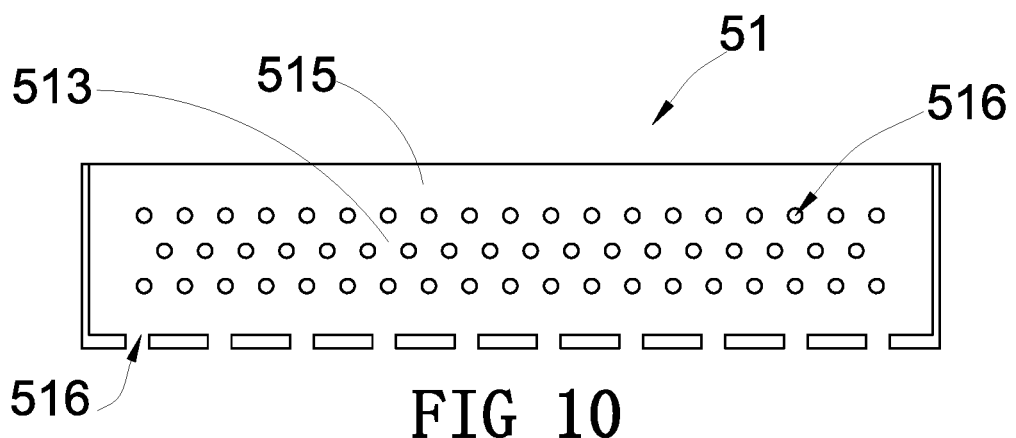
FIG. 10 is a section view of the second water collection basin along plane D-D of FIG. 9.
Figure 11:
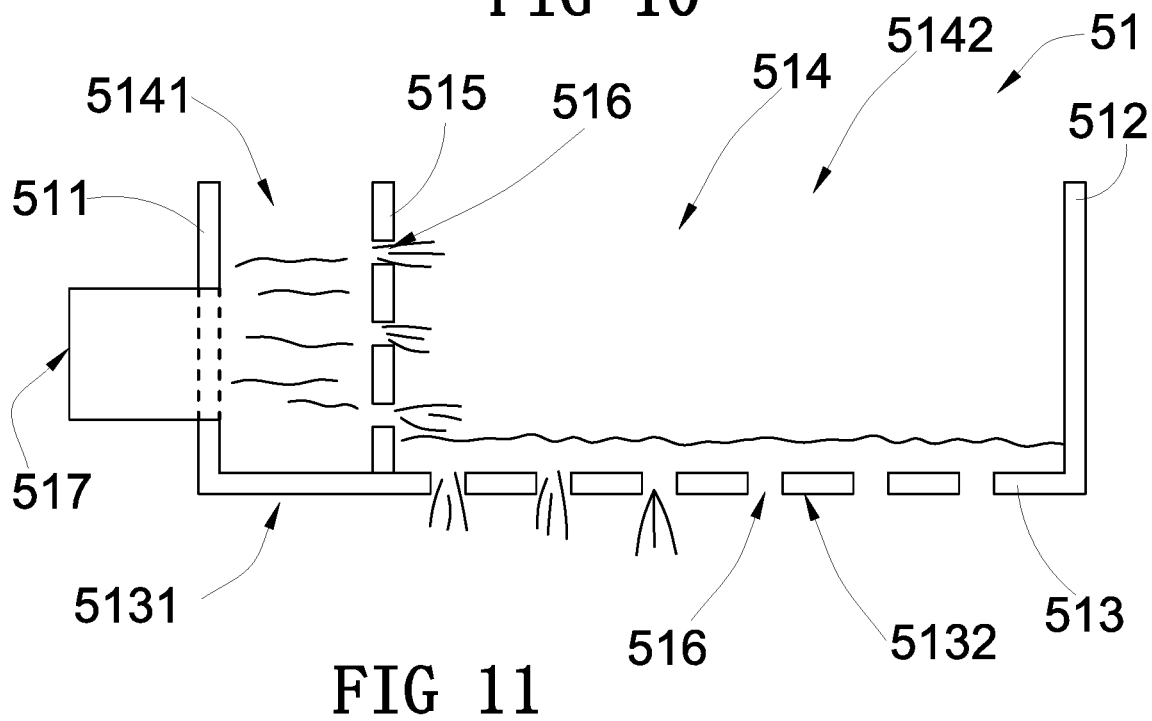
FIG. 11 is a section view of the second water collection basin along plane E-E of FIG. 9.

As shown in FIG. 9 to FIG. 11 of the drawing, the structure of the second multiple layer cooling unit 50 is structurally identical to that of the first multiple layer cooling unit 40 except the absence of any first water receiving basin 43. Specifically, the second water collection basin 51 may also have an elongated cross section and have a second inner sidewall 511, a second outer sidewall 512, and a second bottom wall 513 extended between the second inner sidewall 511 and the second outer sidewall 512. The second water collection basin 51 has a collection cavity 514 formed in a space between the second inner sidewall 511, the second outer sidewall 512 and the second bottom wall 513.

Moreover, the second water collection basin 51 may further have a second partitioning wall 515 upwardly extended from the second bottom wall 513 to divide the collection cavity 514 into a second water guiding compartment 5141 and a second water distribution compartment 5142, and to divide the second bottom wall 513 into an inner portion 5131 and an outer portion 5132, wherein the second water guiding compartment 5141 is formed in a space between the first inner sidewall 511, the second partitioning wall 514, and the inner portion 5131 of the second bottom wall 513. The second water distribution compartment 5142 is formed in a space between the second partitioning wall 514, the second outer sidewall 512, and the outer portion 5132 of the second bottom wall 513.

The second water collection basin 51 may further have a plurality of second passage holes 516 spacedly formed on the second partitioning wall 514 and the outer portion 5132 of the second bottom wall 513 for allowing cooling water to pass therethrough. It is worth mentioning that the second passage holes 516 formed on the second bottom wall 513 may be arranged in a predetermined array, wherein a center of each of the passage holes 516 in a particular row is arranged not to align with that of the passage hole 516 in the next upper or lower row. Moreover, each two adjacent passage holes 516 of an upper row is arranged to form a triangular distribution with a corresponding passage hole 516 of the adjacently upper or lower row of the passage holes 516, as shown in FIG. 10 of the drawings. All of the passage holes 516 may have an identical shape and size.

The second water collection basin 51 may further comprise a second collection inlet 517 provided on the second inner sidewall 511, wherein the second collection inlet 517 may be connected to the water inlet 13 of the tower casing 10 and the second water control valve 54 so that the cooling water stored in the water storage tank 20 may be pumped into the second water collection basin 51 through the second collection inlet 517.

As shown in FIG. 11 of the drawings, the cooling water passing through the second collection inlet 517 may be arranged to temporarily store in the second water guiding compartment 5141. The cooling water in the second water guiding compartment 5141 may pass through the second partitioning wall 515 through the passage holes 516 thereof, and enter the second water distribution compartment 5142.

The cooling water in the second water distribution compartment 5142 is then allowed to flow through the second passage holes 516 formed on the outer portion 5132 of the bottom wall 513 and eventually reach the second fill material unit 52. It is worth mentioning that by using the second partitioning wall 515 for pre-distributing the cooling water coming from the second water guiding compartment 5141, the flow rate and a height of the cooling water in the second water distribution compartment 5142 may also become more or less the same throughout the second water distribution compartment 5142. The cooling water from the second fill material unit 52 may be collected in the water storage tank 30.

Figure 12:
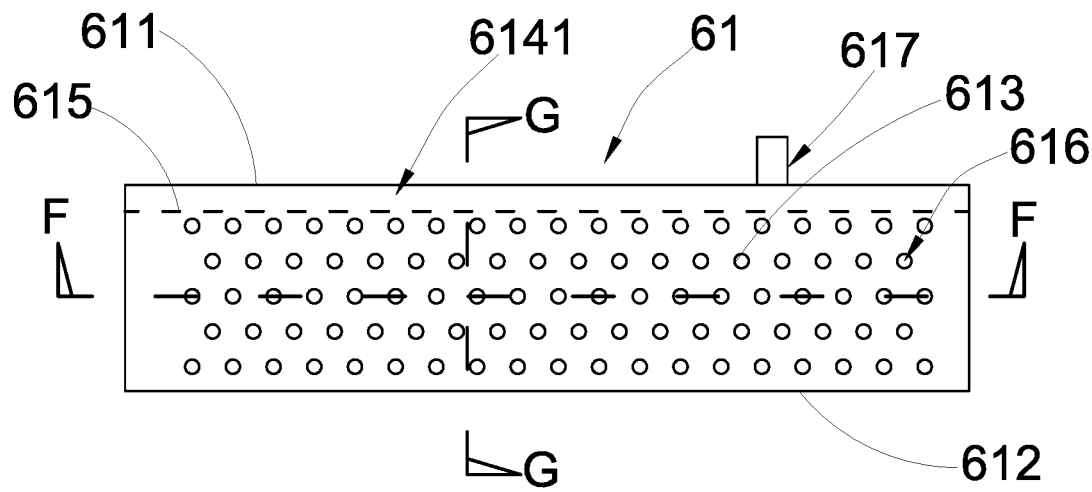
FIG. 12 is a top view of a third water collection basin of the cooling tower according to the preferred embodiment of the present invention, illustrating a circulation path of the cooling water.
Figure 13:
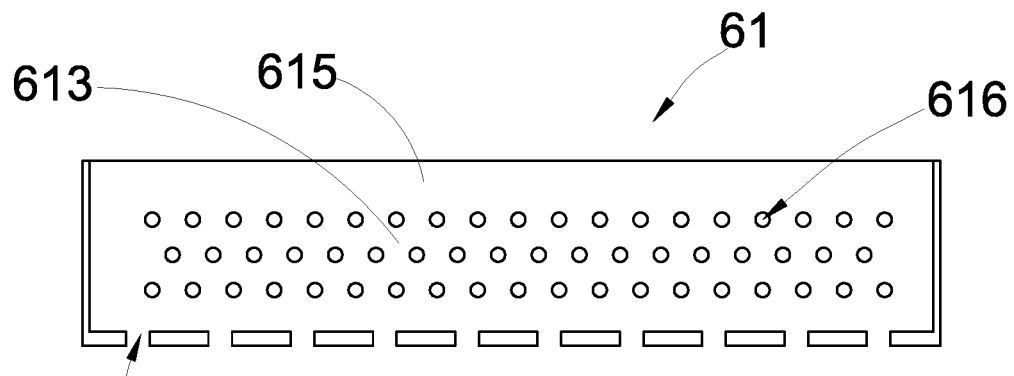
FIG. 13 is a section view of the third water collection basin along plane F-F of FIG. 12.
Figure 14:
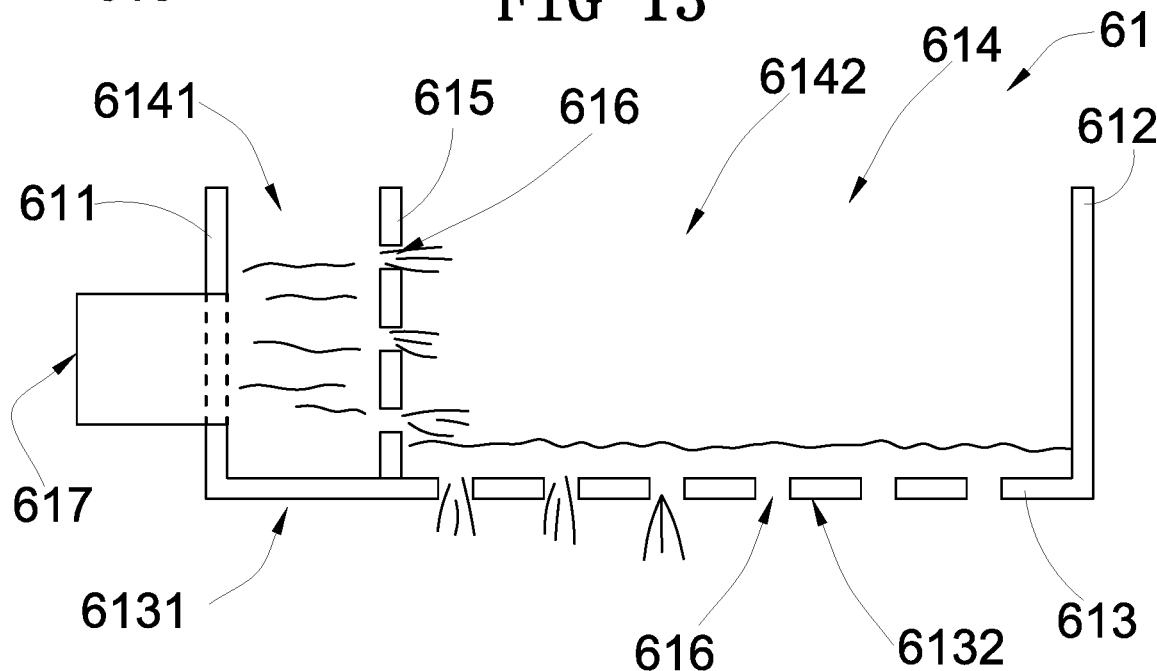
FIG. 14 is a section view of the third water collection basin along plane G-G of FIG. 12.

As shown in FIG. 12 to FIG. 14 of the drawing, the structure of the third multiple layer cooling unit 60 is structurally identical to that of the first multiple layer cooling unit 40. The third water collection basin 61 is positioned underneath the first water receiving basin 43. Specifically, the third water collection basin 61 may also have an elongated cross section and have a third inner sidewall 611, a third outer sidewall 612, and a third bottom wall 613 extended between the third inner sidewall 611 and the third outer sidewall 612. The third water collection basin 61 have a third collection cavity 614 formed in a space between the third inner sidewall 611, the third outer sidewall 612 and the third bottom wall 613.

Moreover, the third water collection basin 61 may further have a third partitioning wall 615 upwardly extended from the third bottom wall 613 to divide the collection cavity 514 into a third water guiding compartment 6141 and a third water distribution compartment 6142, and to divide the third bottom wall 613 into a third inner portion 6131 and a third outer portion 6132, wherein the third water guiding compartment 6141 is formed in a space between the third inner sidewall 611, the third partitioning wall 615, and the third inner portion 6131 of the third bottom wall 513. The third water distribution compartment 6142 is formed in a space between the third partitioning wall 514, the third outer sidewall 512, and the third outer portion 5132 of the third bottom wall 513.

The third water collection basin 61 may further have a plurality of third passage holes 616 spacedly formed on the third partitioning wall 615 and the third outer portion 6132 of the third bottom wall 613 for allowing cooling water to pass therethrough. It is worth mentioning that the third passage holes 616 formed on the third bottom wall 613 may be arranged in a predetermined array, wherein a center of each of the passage holes 616 in a particular row is arranged not to align with that of the passage hole 616 in the next upper or lower row. Moreover, each two adjacent passage holes 616 of an upper row is arranged to form a triangular distribution with a corresponding passage hole 616 of the adjacently upper or lower row of the passage holes 616, as shown in FIG. 13 of the drawings. All of the passage holes 616 may have an identical shape and size.

The third water collection basin 51 may further comprise a third collection inlet 617 provided on the third inner sidewall 611, wherein the third collection inlet 617 may be connected to the water inlet 13 of the tower casing 10 and the third water control valve 64 so that the cooling water stored in the water storage tank 60 may be pumped into the third water collection basin 61 through the third collection inlet 617.

As shown in FIG. 11 of the drawings, the cooling water passing through the third collection inlet 617 may be arranged to temporarily store in the third water guiding compartment 6141. The cooling water in the third water guiding compartment 6141 may pass through the third partitioning wall 615 through the passage holes 616 thereof, and enter the third water distribution compartment 6142.

The cooling water in the third water distribution compartment 6142 is then allowed to flow through the third passage holes 616 formed on the third outer portion 6132 of the bottom wall 613 and eventually reach the third fill material unit 62. The cooling water from the third fill material unit 62 may be collected in the third water receiving basin 63, and may be guided to flow back to the water storage tank 30 in the manner described above.

Figure 15:
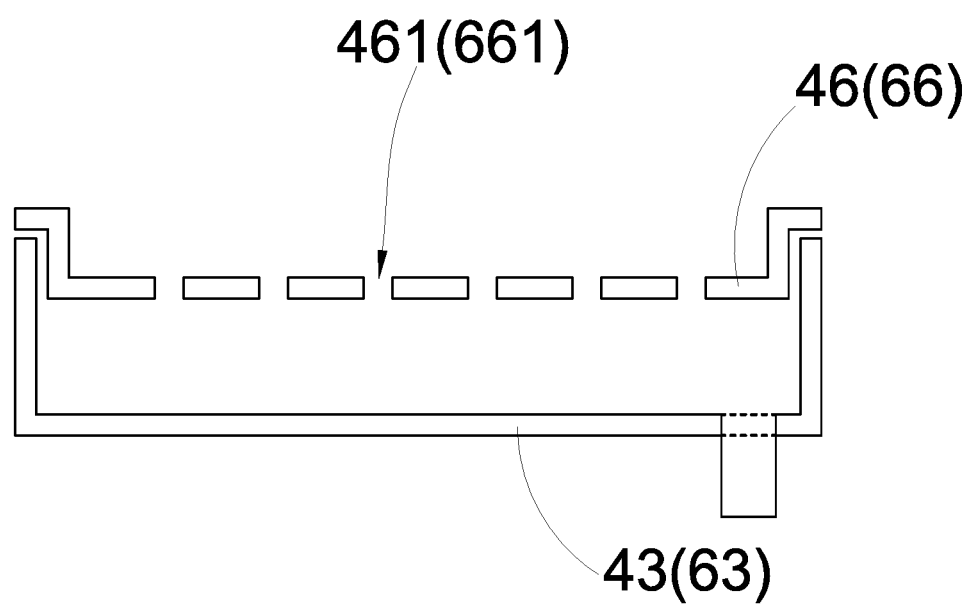
FIG. 15 is an alternative construction of a water receiving basin according to the preferred embodiment of the present invention.
Figure 16:
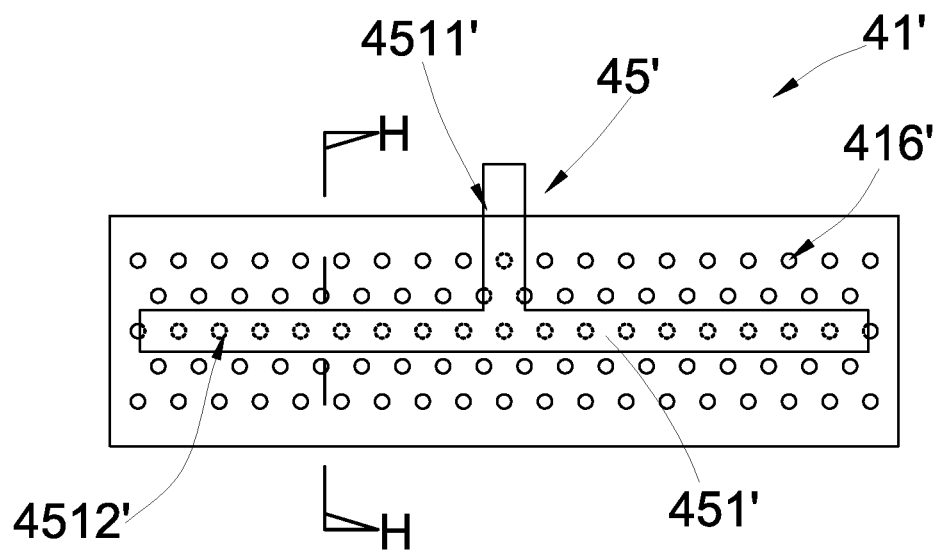
FIG. 16 is an alternative mode of the cooling tower according to the preferred embodiment of the present invention, illustrating a top view of the first water collection basin.

Each of the first water receiving basin 43 and the third water receiving basin 63 may be constructed in a slightly different manner. As shown in FIG. 15 of the drawings, the first multiple-layer cooling unit 40 may further comprise a first guiding tray 46 provided in the first water receiving basin 43, wherein the first guiding tray 46 may have a plurality of first through holes 461 spacedly formed thereon. The cooling water from the first fill material unit 42 may be arranged to fall into the first guiding tray 46, pass through the through holes 461, and reach the first water receiving basin 43.

Similarly, the third multiple-layer cooling unit 60 may further comprise a third guiding tray 66 provided in the third water receiving basin 63, wherein the third guiding tray 66 may have a plurality of third through holes 661 spacedly formed thereon. The cooling water from the third fill material unit 62 may be arranged to fall into third guiding tray 66, pass through the third through holes 661, and reach the third water receiving basin 63.

The cooling water in the first water receiving basin 43 and the third water receiving basin 63 may be arranged to flow back to the water storage tank 30. Accordingly, the first water receiving basin 43 may further have a first water outlet 431 while the third water receiving basin 63 may further have a third water outlet 631. The cooling water in the first receiving basin 43 may exit it through the first water outlet 431. The cooling water in the third receiving basin 63 may exit it through the third water outlet 631. The cooling water exiting the first through third receiving basin 43, 53, 63 may be collected and guided by a common collection pipe 71 which communicate the first through third receiving basin 43, 53, 63 with the water storage tank 30. The cooling water passing through the second fill material unit 52 may fall directly into the water storage tank 30, as shown in FIG. 4 to FIG. 5 of the drawings.

Referring to FIG. 16 to FIG. 21 of the drawings, a first alternative mode of the cooling tower according to the preferred embodiment of the present invention is illustrated. The first alternative mode is similar to the preferred embodiment, except the first through third water collection basin 41', 51', 61'. In this first alternative mode, the first water collection basin 41' may have a first inner sidewall 411', a first outer sidewall 412' and a first bottom wall 413' extended between the first inner sidewall 411' and first outer sidewall 412'. The first passage holes 416' may be formed on the first bottom wall 413'.

Furthermore, the first cooling unit 40' may further comprise a first water delivery assembly 45' connected between the first water collection basin 41' and the corresponding connecting pipe 103 for guiding cooling water to be evenly distributed in the first water collection basin 41'. The first water delivery assembly 45' may comprise a first water delivery pipe 451' having a first transverse portion 4511' and a first longitudinal portion 4512'.

Figure 17:
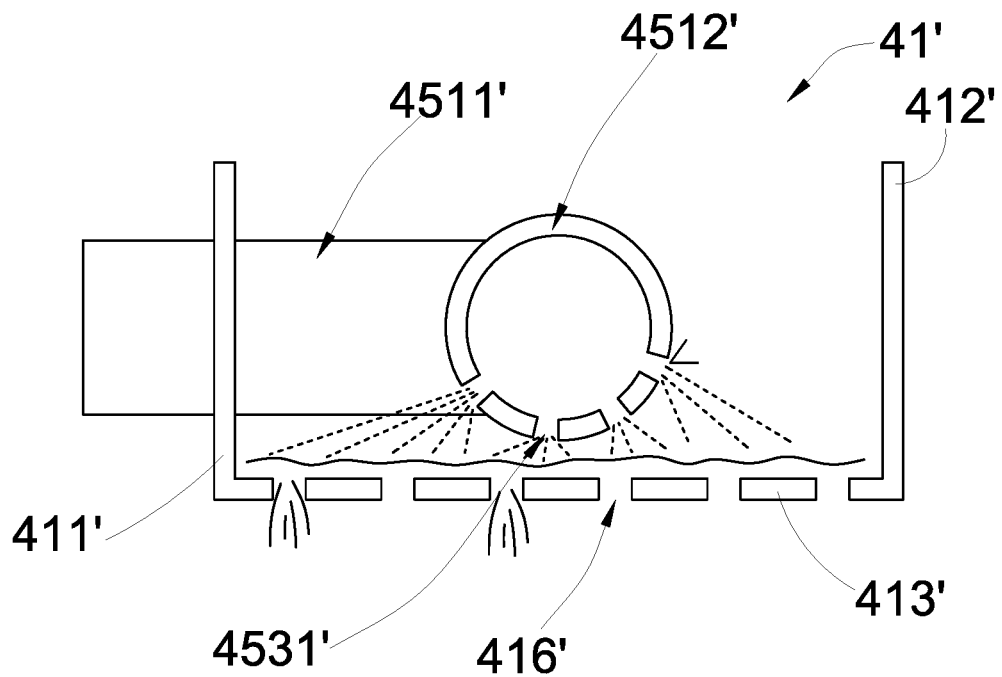
FIG. 17 is a section view of the water collection basin along plane H-H of FIG. 15.

The first transverse portion 4511' may penetrate through the first inner sidewall 411' and may be extended from the corresponding connecting pipe 103. The first longitudinal portion 4512' may extend along a longitudinal direction of the first water collection basin 41' and may have a plurality of first guiding holes 4513' formed thereon for allowing cooling water to flow into the first water collection basin 41'. As shown in FIG. 17 of the drawings, the first guiding holes 4513' may be formed on a lower portion of the first longitudinal portion 4512' of the first water delivery pipe 451'. When cooling water passes through the first water delivery pipe 451', the cooling water may be evenly distributed on the first water collection basin 41'.

In this first alternative mode, the first water collection basin 41', the second water collection basin 51' and the third water collection basin 61' may be structurally identical. They are illustrated in FIG. 16 to FIG. 21 of the drawings. Thus, the second water collection basin 51' may have a second inner sidewall 511', a second outer sidewall 512' and a second bottom wall 513' extended between the second inner sidewall 511' and second outer sidewall 512'. The second passage holes 516' may be formed on the second bottom wall 513'.

Furthermore, the second cooling unit 50' may further comprise a second water delivery assembly 55' connected between the second water collection basin 51' and the corresponding connecting pipe 103 for guiding cooling water to be evenly distributed in the second water collection basin 51'. The second water delivery assembly 55' may comprise a second water delivery pipe 551' having a second transverse portion 5511' and a second longitudinal portion 5512'.

Figure 18:
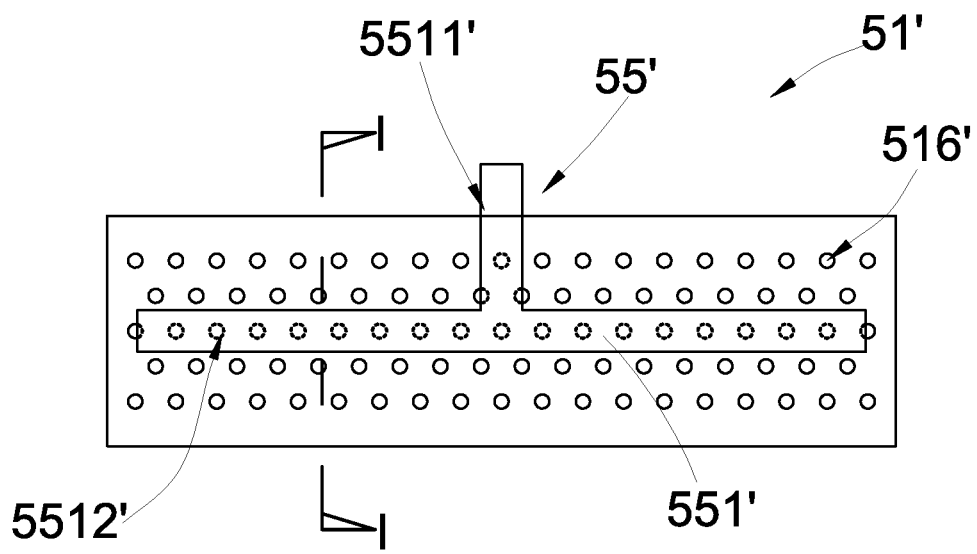
FIG. 18 is a top view of the second water collection basin according to the first alternative mode of the present invention.
Figure 19:
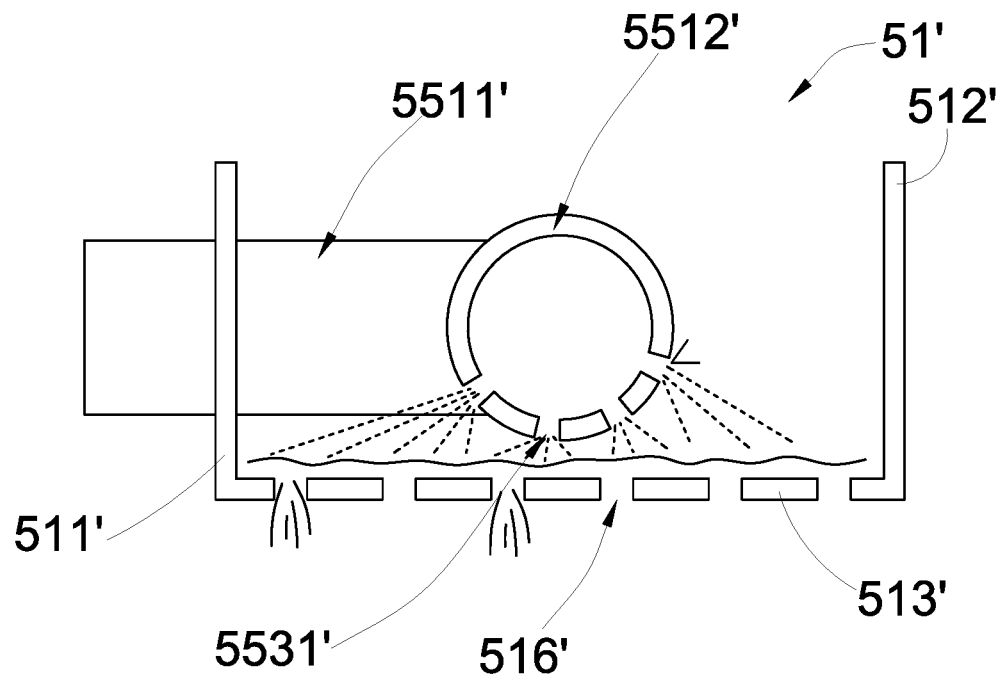
FIG. 19 is a section view of the water collection basin along plane I-I of FIG. 17.

The second transverse portion 5511' may penetrate through the second inner sidewall 511' and extended from the corresponding connecting pipe 103. The second longitudinal portion 5512' may extend along a longitudinal direction of the second water collection basin 51' and may have a plurality of second guiding holes 5513' formed thereon for allowing cooling water to flow into the second water collection basin 51'. As shown in FIG. 18 of the drawings, the second guiding holes 5513' may be formed on a lower portion of the second longitudinal portion 5512' of the second water delivery pipe 551'. When cooling water passes through the second water delivery pipe 551', the cooling water may be evenly distributed on the second water collection basin 51'.

Similarly, the third cooling unit 60' may further comprise a third water delivery assembly 65' connected between the third water collection basin 61' and the corresponding connecting pipe 103 for guiding cooling water to be evenly distributed in the third water collection basin 61'. The third water delivery assembly 65' may comprise a third water delivery pipe 651' having a third transverse portion 6511' and a third longitudinal portion 6512'.

Figure 20:
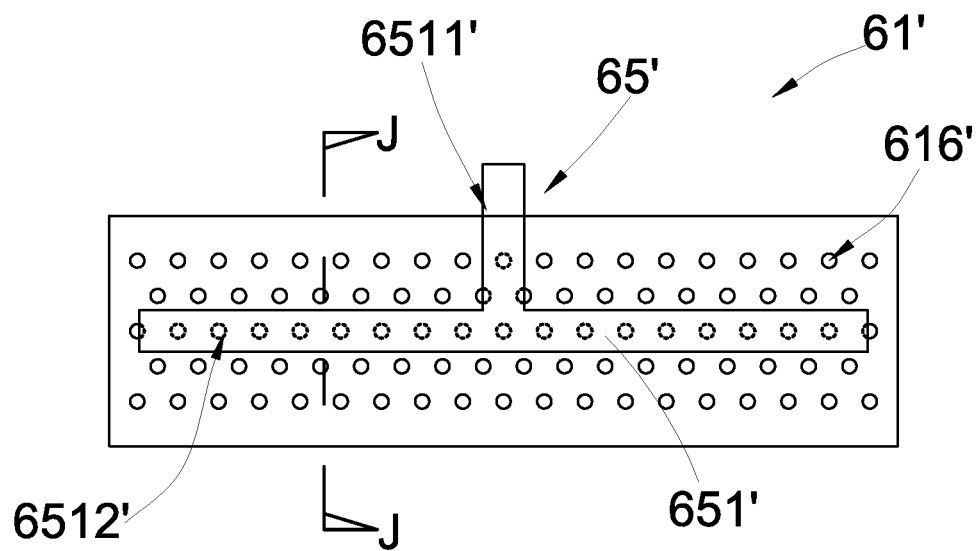
FIG. 20 is a top view of the third water collection basin according to the first alternative mode of the present invention.
Figure 21:
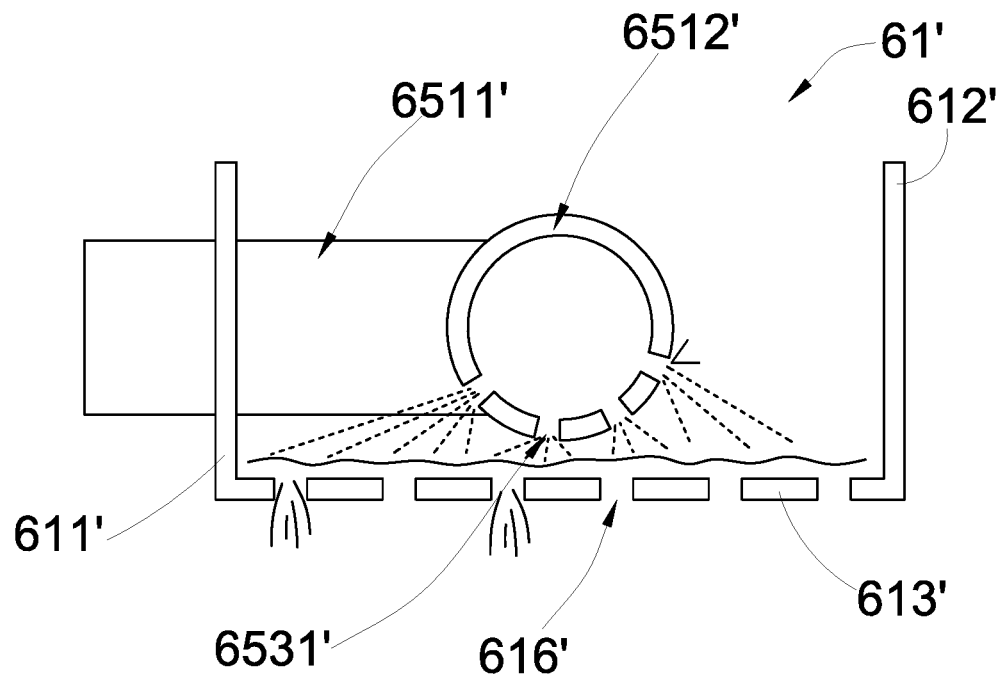
FIG. 21 is a section view of the water collection basin along plane J-J of FIG. 19.

The third transverse portion 6511' may penetrate through the third inner sidewall 6511' and extended from the corresponding connecting pipe 103. The third longitudinal portion 5512' may extend along a longitudinal direction of the third water collection basin 61' and may have a plurality of third guiding holes 6513' formed thereon for allowing cooling water to flow into the third water collection basin 61'. As shown in FIG. 20 of the drawings, the third guiding holes 6513' may be formed on a lower portion of the third longitudinal portion 6512' of the third water delivery pipe 651'. When cooling water passes through the third water delivery pipe 651', the cooling water may be evenly distributed on the third water collection basin 61'.

The present invention, while illustrated and described in terms of a preferred embodiment and several alternatives, is not limited to the particular description contained in this specification. Additional alternative or equivalent components could also be used to practice the present invention.

What is claimed is:

1. A cooling tower for connecting to a heat exchanging device, comprising:
   a tower casing having an air inlet and an air outlet;
   a pumping device provided in said tower casing;
   a water storage tank provided at a bottom portion of said tower casing for storing a predetermined amount of cooling water;
   at least one cooling assembly, comprising:
   a first multiple-layer cooling unit, which comprises:
   a first water collection basin connected to said water storage tank, said cooling water in said water storage tank being arranged to pump to said first water collection basin, said first water collection basin having an elongated cross section and a first inner sidewall, a first outer sidewall, a first bottom wall extended between said first inner sidewall and said first outer sidewall, a collection cavity formed in a space between said first inner sidewall, said first outer sidewall and said first bottom wall, and a first partitioning wall upwardly extended from said first bottom wall to divide said collection cavity into a first water guiding compartment and a first water distribution compartment, and to divide said first bottom wall into a first inner portion and a first outer portion, said first water guiding compartment being formed in a space between said first inner sidewall, said first partitioning wall, and said inner portion of said first bottom wall, said first water distribution compartment being formed in a space between said first partitioning wall, said first outer sidewall, and said outer portion of said first bottom wall, said cooling water being arranged to be pumped to said first water guiding compartment of said first water collection basin, said first water collection basin further having a plurality of first passage holes spacedly formed on said first partitioning wall and said first outer portion of said first bottom wall for allowing cooling water to pass therethrough;
   a first fill material unit provided underneath said first water collection basin, said cooling water in said first water collection basin being arranged to be distributed on said first fill material unit; and
   a first water receiving basin provided underneath said first fill material unit and connected to said water storage tank, said cooling water flowing from said first fill material unit being collected in said first water receiving basin; and
   a second multiple-layer cooling unit, which comprises:
   a second water collection basin connected to said water storage tank, said cooling water in said water storage tank being arranged to pump to said second water collection basin; and
   a second fill material unit provided underneath said second water collection basin, said cooling water in said second water collection basin being arranged to be distributed on said second fill material unit, said water flowing in said second water collection basin being collected in said water storage tank; and
   a fan unit provided in said tower casing for drawing air to flow from said air inlet to said air outlet, said cooling water collected in said water storage tank being arranged to be guided to flow back to said first water collection basin and said second water collection basin in a parallel manner, a predetermined amount of air being drawn from said air inlet for performing heat exchange with said cooling water flowing through said first fill material unit and said second fill material unit for lowering a temperature of said cooling water, said air having absorbed said heat from said cooling water being discharged out of said first fill material unit and said second fill material unit through said air outlet.

2. The cooling tower, as recited in claim 1, wherein said cooling assembly further comprises a third multiple-layer cooling unit provided between said first multiple-layer cooling unit and said second multiple-layer cooling unit, said third multiple-layer cooling unit comprising a third water collection basin, a third fill material unit provided underneath said third water collection basin, and a third water receiving basin provided underneath said third fill material unit, said third water collection basin being connected to said water storage tank, said cooling water in said third water collection basin being arranged to be evenly distributed on said third fill material unit, said cooling water flowing from said third fill material unit being collected in said third water receiving basin, said cooling water collected in said third water receiving basin being guided to flow back to said water storage tank.

3. The cooling tower, as recited in claim 2, wherein said tower casing further has a water inlet and a water outlet, said water inlet communicating said first through third water collection basin with said heat exchanging device, said cooling water from said heat exchanging device being guided to flow through said water inlet and distributed to said first water collection basin, said second water collection basin and said third water collection basin.

4. The cooling tower, as recited in claim 3, wherein said first multiple-layer cooling unit further comprises a first water control valve connected to said first water collection basin for controlling said flow rate of said cooling water flowing into said first water collection basin.

5. The cooling tower, as recited in claim 4, wherein said second multiple-layer cooling unit further comprises a second water control valve connected to said second water collection basin for controlling said flow rate of said cooling water flowing into said second water collection basin.

6. The cooling tower, as recited in claim 5, wherein said third multiple-layer cooling unit further comprises a third water control valve connected to said third water collection basin for controlling said flow rate of said cooling water flowing into said third water collection basin.

7. The cooling tower, as recited in claim 6, further comprising a common collection pipe connecting said first water receiving basin and said third water receiving basin to said water storage tank.

8. The cooling tower, as recited in claim 7, wherein said first water collection basin further comprising a first collection inlet provided on said first inner sidewall, wherein said first collection inlet is connected to said water inlet of said tower casing and said first water control valve so that said cooling water stored in said water storage tank is capable of being pumped into said first water collection basin through said first collection inlet.

9. The cooling tower, as recited in claim 8, wherein said second water collection basin has an elongated cross section and a second inner sidewall, a second outer sidewall, and a second bottom wall extended between said second inner sidewall and said second outer sidewall, said second water collection basin having a collection cavity formed in a space between said second inner sidewall, said second outer sidewall and said second bottom wall.

10. The cooling tower, as recited in claim 9, wherein said second water collection basin further having a second partitioning wall upwardly extended from said second bottom wall to divide said collection cavity into a second water guiding compartment and a second water distribution compartment, and to divide said second bottom wall into a second inner portion and a second outer portion, said second water guiding compartment being formed in a space between said first inner sidewall, said second partitioning wall, and said inner portion of said second bottom wall, said second water distribution compartment being formed in a space between said second partitioning wall, said second outer sidewall, and said outer portion of said second bottom wall.

11. The cooling tower, as recited in claim 10, wherein said second water collection basin further having a plurality of second passage holes spacedly formed on said second partitioning wall and said second outer portion of said second bottom wall for allowing cooling water to pass therethrough.

12. The cooling tower, as recited in claim 11, wherein said second water collection basin further comprising a second collection inlet provided on said second inner sidewall, wherein said second collection inlet is connected to said water inlet of said tower casing and said second water control valve so that said cooling water stored in said water storage tank is capable of being pumped into said second water collection basin through said second collection inlet.

13. The cooling tower, as recited in claim 12, wherein said third water collection basin has an elongated cross section and a third inner sidewall, a third outer sidewall, and a third bottom wall extended between said third inner sidewall and said third outer sidewall, said third water collection basin having a collection cavity formed in a space between said third inner sidewall, said third outer sidewall and said third bottom wall.

14. The cooling tower, as recited in claim 13, wherein said third water collection basin further having a third partitioning wall upwardly extended from said third bottom wall to divide said collection cavity into a third water guiding compartment and a third water distribution compartment, and to divide said third bottom wall into a third inner portion and a third outer portion, said third water guiding compartment being formed in a space between said first inner sidewall, said third partitioning wall, and said inner portion of said third bottom wall, said third water distribution compartment being formed in a space between said third partitioning wall, said third outer sidewall, and said outer portion of said third bottom wall.

15. The cooling tower, as recited in claim 14, wherein said third water collection basin further having a plurality of third passage holes spacedly formed on said third partitioning wall and said third outer portion of said third bottom wall for allowing cooling water to pass therethrough.

16. The cooling tower, as recited in claim 15, wherein said third water collection basin further comprising a third collection inlet provided on said third inner sidewall, wherein said third collection inlet is connected to said water inlet of said tower casing and said third water control valve so that said cooling water stored in said water storage tank is capable of being pumped into said third water collection basin through said third collection inlet.

* * * * *